United States Patent
Heral et al.

(10) Patent No.: US 9,175,770 B2
(45) Date of Patent: Nov. 3, 2015

(54) SECURED LOCKING CORSET FOR SHUTTER CONTROLLED BY ACTUATOR, IN PARTICULAR ACTUATOR CORSET FOR AIRCRAFT DOOR AND LOCKING METHOD

(75) Inventors: Jean-Marc Heral, Bruguieres (FR); Cédric Rodrigues-Morgado, Toulouse (FR)

(73) Assignees: AIRBUS SAS AND, Blagnac (FR); AIRBUS OPERATIONS SAS, Toulouse (FR)

( * ) Notice: Subject to any disclaimer, the term of this patent is extended or adjusted under 35 U.S.C. 154(b) by 173 days.

(21) Appl. No.: 13/983,272

(22) PCT Filed: Jan. 27, 2012

(86) PCT No.: PCT/FR2012/050178
§ 371 (c)(1), (2), (4) Date: Aug. 1, 2013

(87) PCT Pub. No.: WO2012/104526
PCT Pub. Date: Aug. 9, 2012

(65) Prior Publication Data
US 2013/0305917 A1    Nov. 21, 2013

(30) Foreign Application Priority Data
Feb. 4, 2011    (FR) ...................... 11 50934

(51) Int. Cl.
*B64C 25/16* (2006.01)
*F16J 1/00* (2006.01)
*B64C 25/26* (2006.01)

(52) U.S. Cl.
CPC . *F16J 1/00* (2013.01); *B64C 25/16* (2013.01); *B64C 25/26* (2013.01)

(58) Field of Classification Search
CPC ........ B64C 25/26; B64C 25/30; B64C 25/18; B64C 25/20; B64C 25/16; F16F 9/0254; F16F 9/0263; F16F 9/0272; F16F 9/0245; F16J 1/00
USPC ........................................................ 267/64.12
See application file for complete search history.

(56) References Cited

U.S. PATENT DOCUMENTS 3,203,513 A * 8/1965 Allen ............................ 188/170
4,015,862 A * 4/1977 Bahrman et al. .............. 280/754
(Continued)

FOREIGN PATENT DOCUMENTS

DE    202 09 151    11/2002

OTHER PUBLICATIONS

International Search Report dated Apr. 11, 2012.
(Continued)

*Primary Examiner* — Tien Dinh
*Assistant Examiner* — Alexander V Giczy
(74) *Attorney, Agent, or Firm* — Dickinson Wright PLLC

(57) ABSTRACT

A secure corset is applied in particular to the immobilization in the maximum opening position of an aircraft landing gear cage hatch. The corset has two half-shells that are able to enclose the piston of the actuator having an axis coincident with the common longitudinal axis of the half-shells once they are closed around the piston. Locking pins are able to hold the half-shells around the actuator. The corset also has a casing secured to at least one of the half-shells and equipped with a hooking unit that is able to be coupled to a fixed point on the structure. A structure for varying the distance between the casing and the hooking unit are able to move the hooking unit away from or towards the corset along the common longitudinal axis of the half-shells.

8 Claims, 4 Drawing Sheets

(56) References Cited

U.S. PATENT DOCUMENTS

| | | | | |
|---|---|---|---|---|
| 4,073,345 A | * | 2/1978 | Miller | 172/413 |
| 4,323,001 A | * | 4/1982 | Masclet et al. | 91/25 |
| 4,634,170 A | * | 1/1987 | Lach | 296/76 |
| 4,744,548 A | * | 5/1988 | Hathaway | 267/64.12 |
| 4,791,855 A | | 12/1988 | Matsui | |
| 4,890,703 A | * | 1/1990 | Hathaway | 188/300 |
| 4,981,069 A | * | 1/1991 | Matsui | 92/28 |
| 5,040,747 A | * | 8/1991 | Kane et al. | 244/102 R |
| 5,575,513 A | * | 11/1996 | Tuttle | 292/339 |
| 6,247,564 B1 | * | 6/2001 | Kim | 188/300 |
| 6,520,067 B1 | * | 2/2003 | Hunt et al. | 92/23 |
| 7,243,765 B2 | * | 7/2007 | Marcacci | 188/300 |
| 7,730,579 B2 | * | 6/2010 | Coe | 16/66 |
| 7,980,796 B1 | * | 7/2011 | Salt | 410/77 |
| 2007/0187198 A1 | * | 8/2007 | Born et al. | 188/322.12 |
| 2010/0139429 A1 | * | 6/2010 | Ku | 74/89.37 |
| 2011/0278394 A1 | * | 11/2011 | Ditzler | 244/102 SL |

OTHER PUBLICATIONS

Written Opinion of the International Searching Authority with its English translation.

* cited by examiner

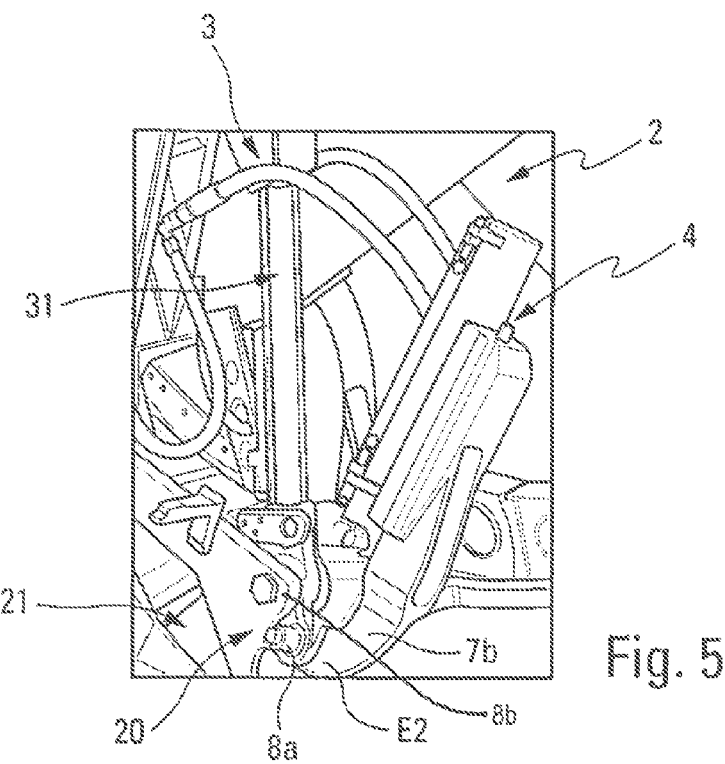
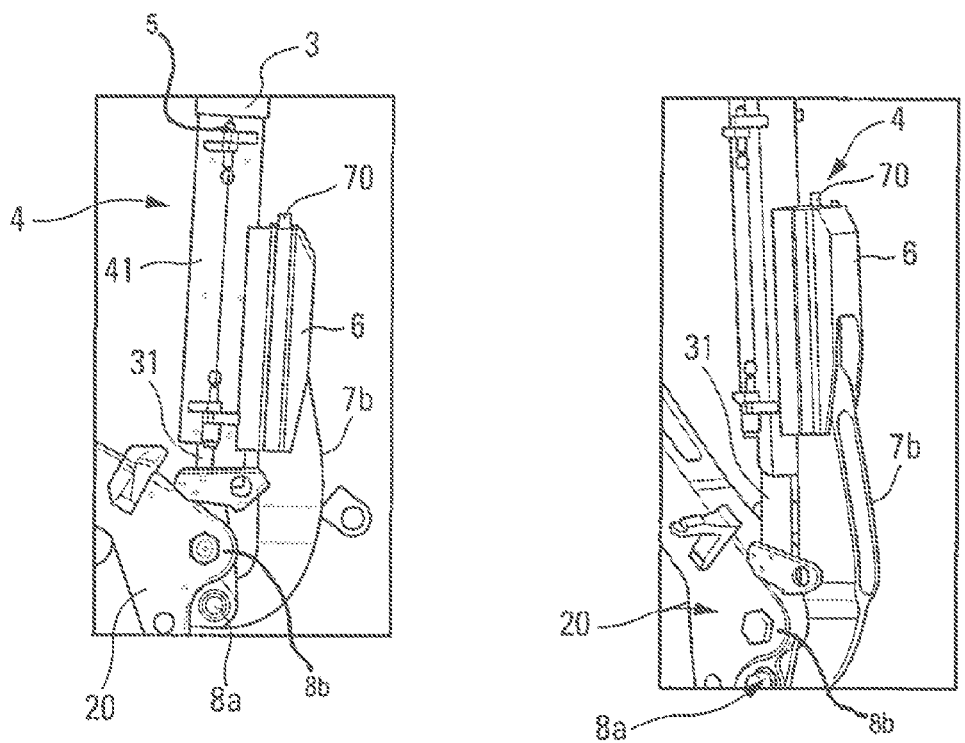
Fig. 5
Fig. 6
Fig. 7

SECURED LOCKING CORSET FOR SHUTTER CONTROLLED BY ACTUATOR, IN PARTICULAR ACTUATOR CORSET FOR AIRCRAFT DOOR AND LOCKING METHOD

BACKGROUND OF THE INVENTION

The invention relates to a corset for securely locking a shutter controlled by an actuator, the shutter being locked in the open position. The corset can in particular be a corset for an actuator for an aircraft landing gear door. The invention also relates to a secure locking method utilizing such a corset.

In the case of machines designed for air travel, as well as in other fields such as the construction and automotive sectors, it is known to control access shutters for internal spaces by means of hydraulic, pneumatic or electric actuators. In order to keep these shutters open entirely reliably during operations carried out through the openings thus created, it is necessary to lock the shutter in the open position.

Locking of this type can be secured by a corset which surrounds the piston of the actuator in the fully deployed position in order to prevent it from sliding. In particular in the field of aeronautics, such corsets have been developed for aircraft landing gear doors. These corsets comprise two articulated half-shells which come to surround the piston of the actuator and which are locked to each other when the actuator is fully extended.

DESCRIPTION OF THE PRIOR ART

In the case of an aircraft, there are three types of locking corset, depending on the type of landing gear, specifically: forward gear, under-wing gear and main gear underneath the body of the fuselage. Main landing gear doors present the particular problem of fully opening the outer doors, from what is termed a hanging open position, and of holding them in this position.

SUMMARY OF THE INVENTION

The invention aims to solve this problem, in particular of securing and controlling the positioning of the corset on the actuator piston, as well as moving the doors into their fully open position and holding them in that position by locking the corsets on the pistons of these doors. To that end, the invention provides the possibility of adjusting the length of the corset.

More specifically, the invention relates to a corset for securely locking a piston of an actuator, having a longitudinal axis and designed to control the opening of a shutter mounted on a structure, the locking being secured in the defined opening position of the shutter, in particular the fully open position. The corset comprises a control unit having attachment means designed to be coupled to a fixed point of the structure and means for varying the distance between the unit and the attachment means. These means for varying the distance are thus designed to move the attachment means further away from or closer to the corset along the longitudinal axis.

According to preferred embodiments:

the means for varying the distance comprise a screw having a threaded rod designed to drive, by rotation, a tapped nut coupled to an extending arm fitted with the attachment means, in particular an extending arm of overall "L" shape;

the means for varying the distance are chosen from a pneumatic, a hydraulic and an electric extension system fitted with the attachment means, in particular a micro-actuator or an actuator having an electric motor;

the control unit is securely fastened to an outer face of the corset, in particular, with the corset comprising two half-shells forming the outer face of the corset, the control unit is securely fastened to at least one of the half-shells;

each half-shell of semi-cylindrical overall shape has, securely fastened to its inner face, half seals, in particular made of TEFLON™ designed to facilitate the sliding of the piston;

the coupling nut is a pivot nut comprising a cylindrical body designed to be inserted into a suitably dimensioned housing of the extending arm, a tapped bore passing through this body and orientation tabs being fitted to the ends of the body.

The invention applies in particular to actuators for outer doors of aircraft landing gear bays. Indeed, a corset of the type described hereinabove is particularly suited to securely locking these outer doors in the fully open position.

In order to implement the corset described hereinabove in an appropriate manner on a piston of a control actuator of an outer door of a landing gear bay, the invention provides an ad hoc secure locking method. In this method, the door is first placed in an intermediate open position, termed a hanging position, which corresponds to a threshold position for locking the opening of the actuator. One end of the arm of the corset is then attached to the bay by said attachment means. The half-shells of the above corset are then tightened around the piston and are locked once closed around the piston. The distance between the unit and the extending arm is then increased until the actuator is fully deployed and the door is fully open.

BRIEF DESCRIPTION OF THE DRAWINGS

Other features and advantages of the invention will become clear upon reading the following description with reference to the appended figures, in which:

FIG. 5 shows a view of the interior of a main landing gear bay, with the outer door in the hanging position and the corset coupled to the gear by its extending arm;

FIG. 6 shows a front view after the corset has closed around the piston of the control actuator of the outer door; and FIG. 7 shows the same view after the actuator has been fully extended.

DETAILED DESCRIPTION OF AN EMBODIMENT

Figure 1:
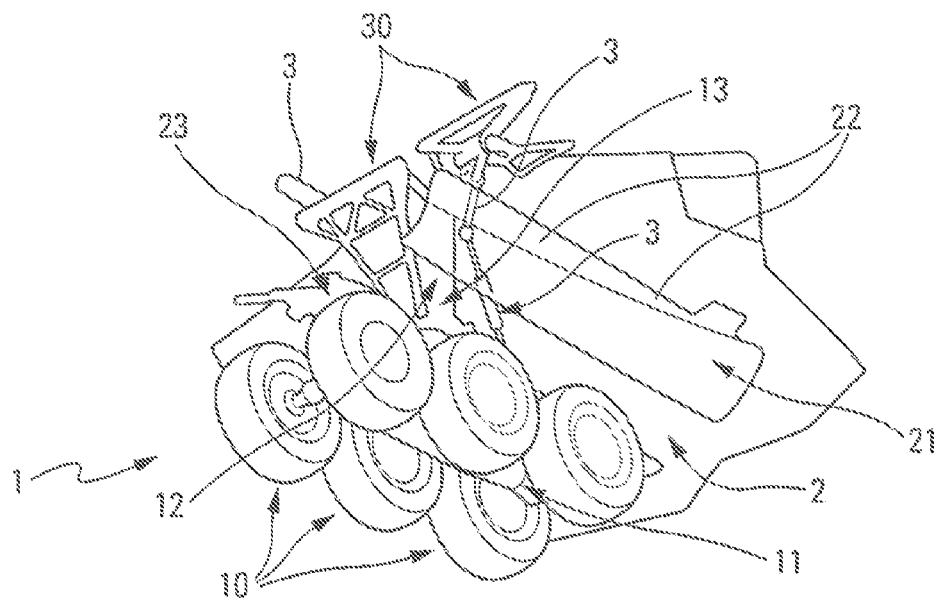
FIG. 1 shows a view in perspective of a main landing gear of an airplane in the "lowered" position.

With reference to the view in perspective of a main landing gear 1 of an airplane of FIG. 1, it can be seen that this gear comprises six wheels 10 mounted on an axle 11 coupled to a box 12 fitted with a shock absorber 13. The gear exits from a bay 2 through three types of doors: two outer doors 21 (only one of which is shown in the figure) articulated to two central doors 22 and two internal doors 23 (only one of which is shown). The movement of these doors is controlled by virtue of the fact that they are connected to actuators 3 which in turn press against frameworks 30.

Figure 2:
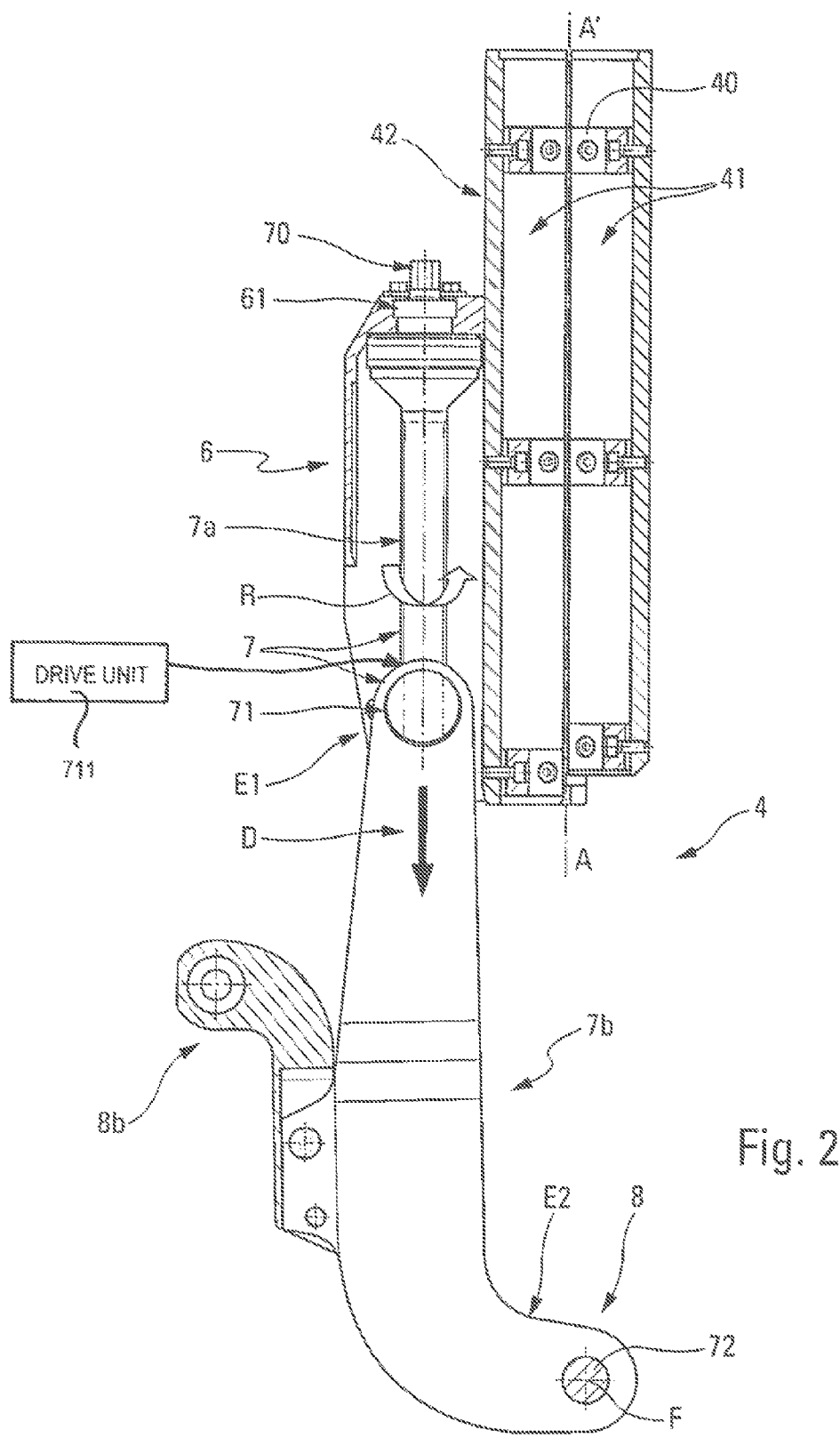
FIGS. 2 and 3 show views in section and in perspective of a corset according to the invention.
Figure 3:
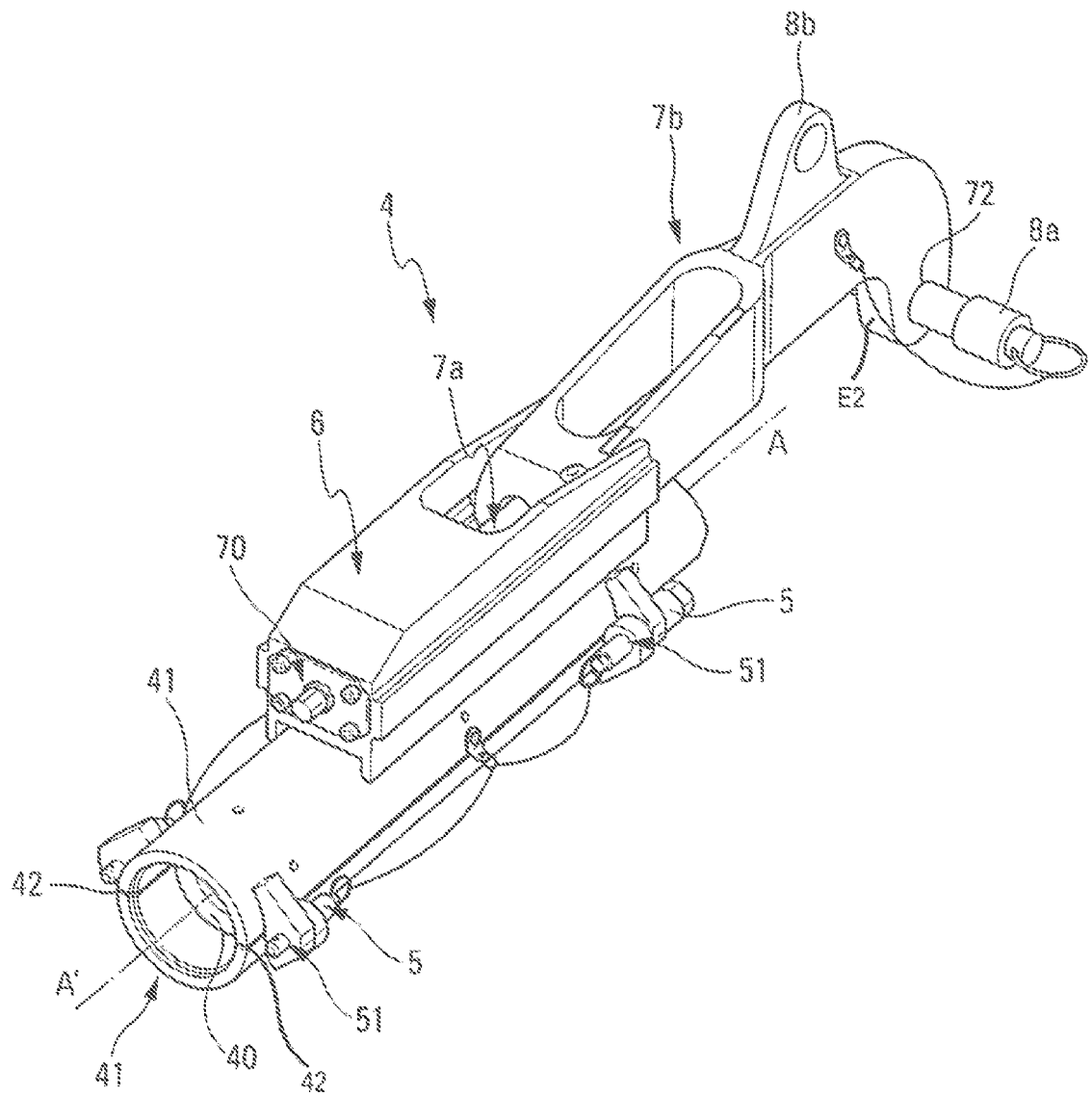

When on the ground, the actuators 3 are locked in the extended position by corsets. As regards the outer doors 21, the corsets must make it possible to hold these doors in the fully open position. One example of a secure locking corset 4, which is suited to holding in this way, is shown in FIGS. 2 and 3, respectively in longitudinal section and in perspective.

A corset 4 of this type comprises an outer face, formed in this case by two half-shells 41 of cylindrical overall shape, each having a longitudinal axis. In the closed position, the axes of the half-shells coincide along one and the same axis A'A. These half-shells are designed to tighten around the piston 31 of the actuator 3, the axis of which coincides with the common longitudinal axis A'A of the half-shells once these are closed around the piston. Moreover, these half-shells are articulated to each other by means of hinges 42, and are held in the closed position around the actuator by locking means, in this case pins 5 arranged in recesses 51 arranged on the other side from the hinges 42.

The corset 4 also comprises a control unit 6 securely fastened, for example welded, to one of the half-shells 41, and means 7 for varying the distance between the unit 6 and means 8 for attaching the corset 4 to an element of the structure of the gear bay. In the example, the means for varying the distance consist of a threaded rod 7a which is free to rotate through a channel 61 in the unit 6, and is designed to drive a tapped pivot nut 71 in rotation.

This nut 71 is mounted transversely at one end E1 of an extending arm 7b, advantageously an "L"-shaped arm. This shape makes it possible to balance the masses making up the corset 4. At the other end E2 of this arm 7b, an opening 72 has been created in order to receive a pin 8a for attaching the arm 7b, and more generally the corset, to a fixed point F of the structure. Additional attachment means 8b are also provided.

When the rod 7a is in rotation (arrow R), driven by a screwdriver in connection with a hex nut 70 arranged at the head of the rod 7a, the pivot nut 71 moves along the rod 7a. This movement increases the distance (arrow D), along the common longitudinal axis A'A of the half-shells 41, between the unit 6 and the arm 7b when the rod 7a rotates in one direction (arrow R) and decreases the distance when the rod rotates in the other direction. Increasing the distance thus moves the half-shells 41 away from the fixed point F.

As an alternative, the means for varying the distance can consist of a micro-actuator, or an actuator having an electric motor, fitted with the attachment means, such as a drive unit 711 illustrated in FIG. 2.

Figure 4:
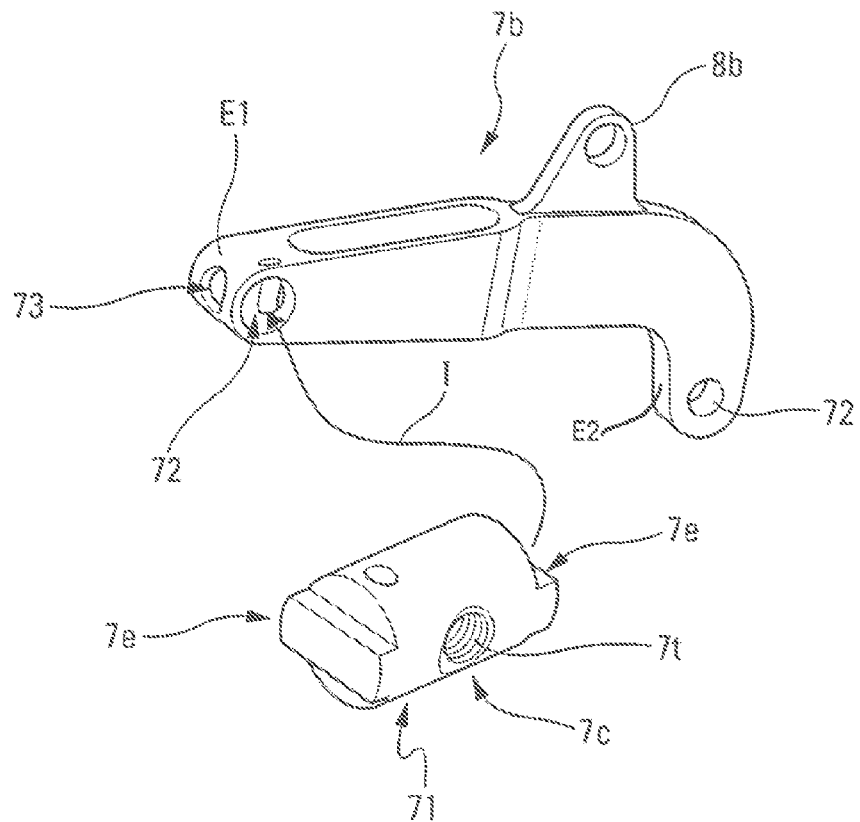
FIG. 4 shows an exploded view of an extending arm and a pivot nut fitted to this arm.

The pivot nut 71 and the arm 7b are described with reference to FIG. 4. The nut 71 comprises a cylindrical body 7c, through which there passes a tapped bore 7t of the same pitch as the threaded rod. The ends 7e form rectangular tabs for the purpose of orienting the pivot nut 71 after it has been inserted (arrow I) into a recess 72 provided for this purpose in the arm 7b. The pivot nut 71 is thus aligned with the opening 73 formed at the end E1 of the arm 7b in order to receive the threaded rod.

FIG. 5 shows, in greater detail, a view of the interior of a main landing gear bay 2. The outer door 21 is in the hanging position, that is to say that the door can only open further, the opening threshold corresponding to this hanging position. This hanging opening is governed by the control actuator 3. The corset 4 is first of all coupled to an element 20 of the structure of the bay via its extending arm 7b. This arm is fastened, at its end E2, to the element 20 via the attachment pin 8a.

The half-shells 41 of the corset 4 are then opened and tightened around the piston 31 of the control actuator 3 of the outer door, as illustrated with reference to FIG. 6. The longitudinal axes of the piston and of the half-shells then coincide. Once the half-shells 41 have closed around the piston 31, they are locked by the pins 5. In order to avoid deterioration of the surface of the piston 31 and in order to facilitate the sliding of the piston and the corset with respect to each other, each half-shell 41 is fitted, on its inner face, with annular half seals (FIG. 3) made of TEFLON™. These seals are connected to said internal wall by means of screws.

The distance between the unit 6 and the extending arm 7b is then increased (FIG. 7) by screwing the nut 70 of the threaded rod until the actuator 3, driven by the corset 4, is fully deployed. The door is then fully open. The actuator is then securely locked by means of the corset being put in place.

The invention is not limited to the examples described and represented. It is for example possible to provide a single molded shell for the unit and one half-shell or for all the corset with subsequent separation in order to allow the opening thereof. It is also possible to make deployment of the arm of the corset automatic, for example by means of a remote control.

Moreover, the corset can be made of any material capable of withstanding high pressures, of steel or of high density plastic.

Furthermore, two markings of different colors can be applied to the corset: a first marking which is visible to the operator when the corset is in the hanging door position, and a second marking which becomes visible to the operator when the corset is in the fully extended position, the outer door being fully open.

The invention claimed is:

1. A corset for securely locking a piston of an actuator of a landing gear cage hatch of an aircraft, the corset having a longitudinal axis, the corset comprising:
    a locking unit structured to secure an opening position of a shutter of the landing gear cage hatch, the shutter being mounted on a structure of the landing gear cage hatch, the locking unit being structured to lock the piston at a position corresponding to a defined opening position of the shutter;
    a control unit fastened to the locking unit;
    an attacher structured to be coupled to a fixed point of the structure of the landing gear cage hatch; and
    a distance varying unit structured to be coupled to the control unit and the attacher and to vary the distance between the control unit and the, attacher to move the attacher further away from or closer to the locking unit along the longitudinal axis.

2. The locking corset as claimed in claim 1, wherein the distance varying unit comprise a screw having a threaded rod that is coupled with a tapped nut and drives, by rotation, the tapped nut which is coupled to an extending arm fitted with the attacher.

3. The locking corset as claimed in claim 2, wherein the overall shape of the extending arm is an "L" shape.

4. The locking corset as claimed in claim 1, wherein the locking unit comprises two half-shells, each half-shell being of semi-cylindrical overall shape and having an inner face securely fastened to half seals structured to facilitate sliding of the piston of the actuator.

5. The locking corset as claimed in claim 2, wherein tapped nut is a pivot nut comprising a cylindrical body inserted into a housing of the extending arm, a tapped bore passing through the cylindrical body and orientation tabs being fitted to the ends of the cylindrical body.

6. The locking corset as claimed in claim 1, wherein the the distance varying unit comprises one of a pneumatic, a hydraulic and an electric extension system fitted with the attacher.

7. A method of using the corset as claimed in claim 1 to securely lock actuators for outer doors of an aircraft landing gear bay, the outer doors being locked in a fully open position.

8. A method as claimed in claim 7, wherein the doors are first placed in a hanging open position which corresponds to a threshold position for locking the opening of the actuator and one end of the extending arm of the corset is then attached to the bay by the attacher, an half-shells of the corset are then tightened around the piston and are locked once closed around the piston, and the distance between the control unit and the extending arm is then increased until the actuator is fully deployed and the door is fully open.

* * * * *